June 10, 1924.
D. CSANDY
1,497,090
ROAD AND STREET ILLUMINATION BY VEHICLES
Filed Dec. 5, 1923
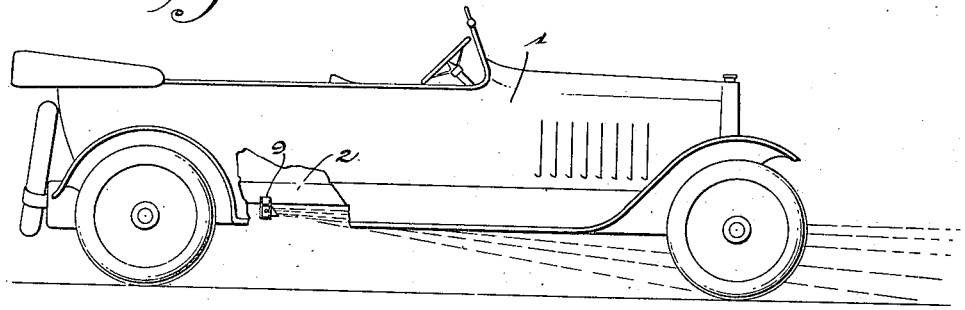
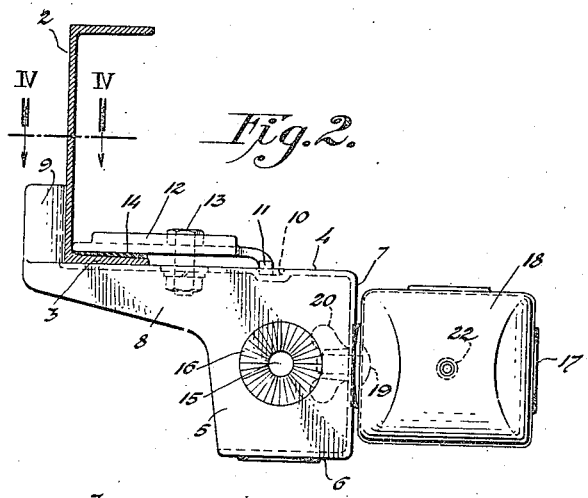
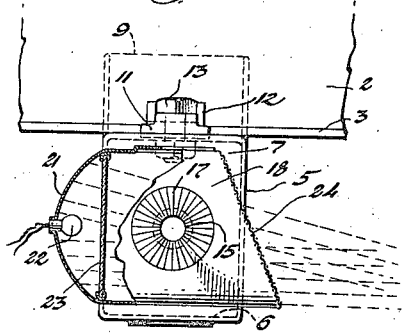
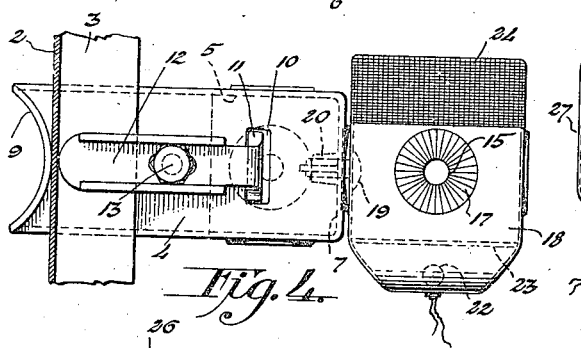
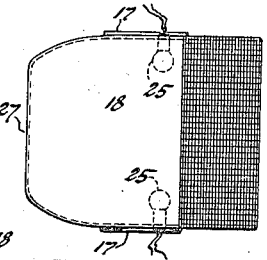
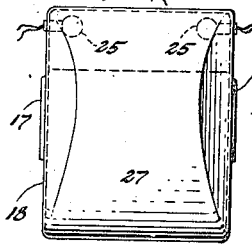
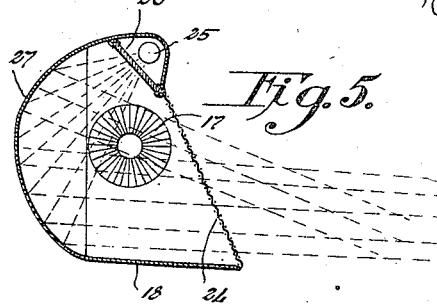
Inventor:
Dejoe Csandy
By
Attorneys Patented June 10, 1924.

1,497,090

UNITED STATES PATENT OFFICE.

DEJOE CSANDY, OF DETROIT, MICHIGAN.

ROAD AND STREET ILLUMINATION BY VEHICLES.

Application filed December 5, 1923. Serial No. 678,607.

*To all whom it may concern:*

Be it known that I, DEJOE CSANDY, a citizen of Hungary, residing at Detroit, in the county of Wayne and State of Michigan, have invented certain new and useful Improvements in Road and Street Illumination by Vehicles, of which the following is a specification, reference being had therein to the accompanying drawings.

This invention relates to road and street illumination by vehicles and has special reference to a lighting system carried by automobiles or other vehicles for illuminating a road, street or other surface on which the automobile travels, without producing a glare or such intense rays of light that would blind, confuse or interfere with the driving of an automobile or other vehicle approaching the light carrying automobile. It is a well known fact that the drivers of automobiles, pedestrains and others are often bewildered by the glare of headlights and lamps on the front end of an approaching automobile, and many instances are contributing to such cause. I am aware that dimming devices, anti-glare shields and especially designed headlights have been invented all with a view to preventing a glare from the front end of an automobile, and I find that better results may be attained by changing the location of a source of light, even dispensing with the large headlights or lamps usually carried at the front end of an automobile.

My invention aims to provide novel means for supporting a source of light under an automobile body, instead of on the front end thereof, so that the rays of light will be projected forwardly, from beneath the automobile body, on to the street or road, without producing any glaring effect. A road or street can be illuminated a sufficient distance ahead of an automobile to insure safe travel and with the rays of light emitted from under an automobile the greater part of the chassis will be illuminated and this may be an advantage for repairing the chassis at night or to facilitate movement about the automobile.

My invention further aims to provide a universal bracket that may be attached to an automobile chassis or other parts for supporting a lamp in a desired position so that rays of light emitted from the lamp may be cast in a desired direction and for a desired distance from the automobile. The lamp includes novel reflectors and means to prevent stone bruise or other injury to a lamp located under the automobile.

My invention will be hereinafter specifically described and then claimed, and reference will now be had to the drawing, wherein—

Figure 1 is a side elevation of an automobile, partly broken away, showing a lamp installation in accordance with this invention;

Fig. 2 is an enlarged cross sectional view of an automobile chassis frame provided with a bracket and lamp;

Fig. 3 is a side elevation of the same partly broken away and partly in section;

Fig. 4 is a horizontal sectional view taken on the line IV—IV of Fig. 2;

Fig. 5 is a longitudinal sectional view of a form of lamp that may be used;

Fig. 6 is a plan of the same; and

Fig. 7 is a rear elevation of the same.

In the drawings, 1 denotes, by the way of a vehicular example, an automobile including a chassis frame 2, which ordinarily is in the form of a channel bar having a lower inturned flange 3. This flange represents one of the many parts or places under the automobile body where I may mount my lamp so that its rays of light will be projected forwardly from under the automobile a desired distance in advance thereof, with the rays of light in planes below a projected horizontal plane of the automobile chassis. In so locating the lamp, as shown in Fig. 1, it is not necessary to use headlights on the front end of the automobile for street or road illumination, although very small lamps may be carried simply for parking or other purposes.

In order that the lamp may be safely supported relative to the under framing of the automobile or any other vehicle, I provide a novel form of bracket which includes a top wall 4, side walls 5, bottom wall 6, and an end wall 7, all of said walls being preferably integral with the top wall 4 of greater length than the side walls 5 and braced relative to said side walls by extensions 8 thereof. The top wall 4 has one end thereof provided with an upstanding curved flange 9 and adjacent the opposite end of said wall is a depression 10. The depression 10 is adapted to receive the head 11 of a channel shaped clamping member 12 which co-operates with the top wall 4 in holding the bracket relative to the flange 3, the wall 4 being placed against the lower face of the flange 3 with the flange 9 engaging the outer wall of the frame 2. The bracket and clamping member are connected by a nut equipped bolt 13 or other detachable fastening means, and a pad 14 of rubber or like material may be interposed between the flange 3 and the clamping member 12. The bracket is supported as rigid as possible relative to the chassis frame 2 and projects inwardly from the frame so as not to interfere with the running board or any other part of the automobile.

The walls 5, 6 and 7 of the bracket are provided with bolt openings 15 and surrounding the outer ends of said bolt openings are toothed or serrated bosses or clutch members 16 adapted to be engaged by similar bosses or clutch members 17 carried by the side and top walls of a lamp housing 18 and a screw bolt 19 of a lamp housing is adapted to extend through the boss or clutch members 16 and 17 and with a winged thumb nut 20 on said screw bolt cooperate therewith in holding the lamp housing in engagement with either of the walls that it may be placed against. It is by virtue of the toothed bosses or clutch members 16 and 17 that a lamp housing 18 may be turned or tilted so that rays of light emitted from the lamp housing may be cast in a desired direction and for a desired distance.

Referring to Fig. 3 the lamp housing 18 includes a reflector 21, a source of light 22, a lens 23 and a screen 24, said screen preventing the interior of the lamp from being injured by stone bruise. Another form of lamp is shown in Figs. 5, 6 and 7 wherein sources of light 25 are located in the upper portion of the housing, at the sides thereof and in proximity to a lens 26, the source of light casting its rays on a reflector 27 and from said reflector forwardly and downwardly through the screen 24. The source of light 22 and 25 may be incandescent lamps included in the lighting circuits of the automobile and controlled by suitable switches.

On account of there being many makes of automobiles and other vehicles, I have designed the bracket so that it may be easily and quickly attached to various parts of an automobile and by having the lamp housing applicable to different walls of the bracket, it is obvious that the lamp may be properly positioned for casting rays of light at a desired angle and for a desired distance in order that a street or road-way may be illuminated in front and at the sides of the automobile to insure reasonably safe travel. Since the source of light is located under an automobile the road or street will more or less serve as a reflector for illuminating the underframing of the automobile and at a distance, cause the automobile to be somewhat outlined in the dark, whereby its approach may be readily observed without any confusing glare as ordinarily experienced when two automobiles are approaching each other in the dark.

It is obvious that by dispensing with the glare of headlights the driver of an approaching automobile is relieved of eye and nerve strain and accidents materially reduced. Furthermore, by arranging for indirect lighting under an automobile and dispensing with the usual front headlights greater pleasing outlines may be imparted to the front end of an automobile.

While in the drawings there are illustrated the preferred embodiments of my invention, it is to be understood that the structural elements are susceptible to such variations and modifications as fall within the scope of the appended claims.

What I claim is:—

1. A lamp bracket comprising a plurality of walls, clutch members carried by some of said walls, and means applicable to each clutch member adapted for holding a lamp in engagement therewith.

2. Lamp supporting means, comprising a bracket adapted for attachment to the vehicle under the same and at a remote point from the front end of the vehicle, said bracket having a plurality of walls either of which is adapted to support a lamp, and a clamp member for said bracket.

In testimony whereof I affix my signature in presence of two witnesses.

DEJOE CSANDY.

Witnesses:
 ANNA M. DORR,
 KARL H. BUTLER.